R. H. SCHULTZ.
DEVICE FOR CUTTING ICE CREAM.
APPLICATION FILED FEB. 16, 1921.
1,431,692.
Patented Oct. 10, 1922.
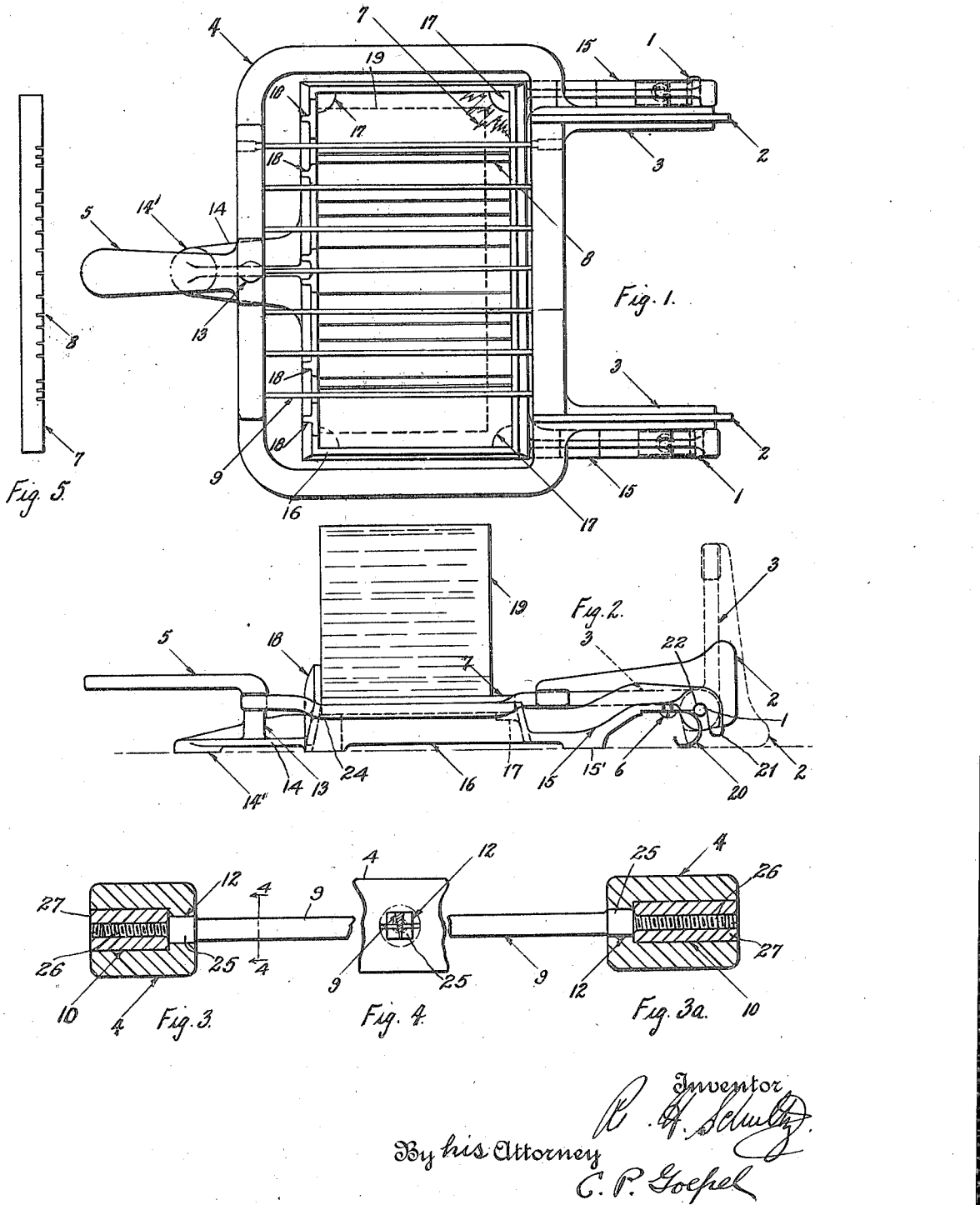

Patented Oct. 10, 1922.

1,431,692

UNITED STATES PATENT OFFICE.

RUDOLPH H. SCHULTZ, OF BROOKLYN, NEW YORK.

DEVICE FOR CUTTING ICE CREAM.

Application filed February 16, 1921. Serial No. 445,538.

*To all whom it may concern:*

Be it known that I, RUDOLPH H. SCHULTZ, a citizen of the United States, and resident of the borough of Brooklyn, county of Kings, city and State of New York, have invented certain new and useful Improvements in a Device for Cutting Ice Cream, of which the following is a specification.

This invention relates to a device for cutting ice cream and the like and has for its primary object to provide a light, simply constructed and inexpensive machine, whereby blocks of ice cream may be expeditiously cut or divided into a plurality of small sections or parts.

It is one of the important objects of the invention to provide a machine for the above purpose having a pivotally movable detachable knife carrying frame whereby any one of a series of such knife frames may be easily and quickly assembled in operative position to cut or divide ice cream blocks into a pre-determined number of sections.

As another item of improvement in devices of this character, I have devised a simple and efficient means for detachably securing the ends of a plurality of wire knives in the movable frame, whereby any one of the cutting knives can be readily removed from said frame and replaced by a new knife.

It is an additional object of my present invention to provide an improved base frame construction with means for supporting a slab of suitable insulating material upon which the ice cream block is placed and to so construct said base frame and a movable knife carrying frame that when said frames are disposed in parallel relation to each other, the separated portions of the ice cream block can be readily removed from the insulating slab without obstruction.

With the above and other objects in view, the invention consists in the improved combination, construction and relative arrangement of the several parts as will be hereinafter more fully described, illustrated in the accompanying drawings and subsequently incorporated in the subjoined claims.

In the drawings wherein I have illustrated one practical and satisfactory embodiment of the invention and wherein similar reference characters designate corresponding parts throughout the several views, Figure 1 is a plan view of an ice cream cutting machine constructed in accordance with the present invention;

Figure 2 is an end elevation thereof;

Figures 3 and 3ª are detail sectional views, showing the means for removably securing the ends of the cutting knives in the pivoted frame;

Figure 4 is a sectional view taken on the line 4—4 of Figure 3, and

Figure 5 is an edge view of the insulating slab.

Referring in detail to the drawings, the base 16 of the machine is in the form of a rectangular frame, said frame being provided at its corners, interiorly thereof and adjacent to the upper edge, with inwardly projecting lugs 17, the purpose of which will be presently referred to. At its opposite ends the frame 16 is provided with the arms 15, extending laterally from one side thereof, each of said arms having an upwardly offset end portion terminating in a downwardly extending finger 21 located at the outer side of a pivot receiving recess 22. At its opposite side the frame 16 is centrally formed with a laterally projecting arm 14 provided on its underside and at its extremity with the boss 14' to engage upon the table or other support. Each of the arms 15 is also formed with a similar boss 15'. Upon the arm 14 intermediate of its ends, a vertically disposed post or standard 13 is formed which serves as a stop to limit the downward movement of the movable knife carrying frame to be presently described.

The longitudinal side bar of the base frame 16 from which the arm 14 projects is provided with the spaced fastening lugs 18 which afford stops against which the ice cream block indicated at 19 is adapted to engage. In order to prevent the rapid conduction of heat to this block and the consequent melting thereof, I provide the slab 7 of wood or other suitable insulating material. This insulating slab is adapted to be arranged within the upper edge of the base frame 16 and is removably seated upon and supported by the lugs 17. The slab 7 is provided in its upper surface with a plurality of spaced grooves 8 to receive the cutting knives carried by the movable frame.

The knife carrying frame 4 is in the form of a continuous bar and is of general rectangular shape in plan of somewhat greater dimensions than the rectangular base frame 16. Arms 3 project laterally from one side of the frame 4 adjacent to each end thereof and terminate in the foot portions 2 in each of which a pivot pin or stud 1 is fixed, said pivot studs projecting from the outer side of each of said arms. These studs are adapted for engagement in the notches 22 and are yieldingly held in said notches by means of the leaf springs 20 of requisite tension which are opposed to the downwardly projecting fingers 21. Each of these springs at one of its ends is fixed to the underside of one of the arms 15 of the base frame by means of a screw 6.

The end portions of the frame 4 are angularly offset as at 24 and disposed out of the plane of the longitudinal side portions of said frame. The advantage of this construction will hereinafter appear. Between the longitudinal side portions of the frame 4 the cutting knives 9 extend. Each of these cutting knives is of non-corrosive wire and is of wedge or V-shaped form in cross section as clearly shown in Figure 4 of the drawings. Adjacent to its opposite ends the knife is provided with enlargements 25 of polygonal form. As herein shown these enlargements are square or rectangular and are fitted into openings 12 of similar shape in the frame bar, the said openings communicating with cylindrical sockets 10. Each of the knives terminates in a threaded stem 26 which is adapted to receive an interiorly threaded sleeve or bushing 27 fitted into the socket 10 of the frame. It will be understood that this socket opens on the outer side of the frame and as the bushing 27 is threaded upon the stem 26 of the cutting knife, it gradually moves into the socket until said bushing engages the enlargement 25 on the knife blade. These enlargements effectually prevent turning or twisting movement of the knife blade. Should anyone of the knives be broken or require repair it may be readily removed from the frame and replaced by a new knife. The knives 9 may be arranged in any suitable spaced relation in the frame and different frames can be provided with the series of knives differently spaced from each other and interchangeably used in connection with the base frame 16. The knife carrying frame 4 is formed with a suitable handle 5 whereby it may be conveniently manipulated.

In the use of my invention, as above described, the frame 4 is first disposed in a vertical position and the pivot lugs 1 on the arms 3 are moved upwardly against the inner sides of the fingers 21 into the recesses 22. As these lugs move past the springs 20, they exert pressure against said leaf springs which yield sufficiently to enable the pivot lugs to properly seat in said recesses. The leaf springs returning to their normal positions exert an upward bearing pressure against the undersides of the pivot lugs and thus overcome the force of gravity and hold said lugs within the recesses during the normal operation of the device. When the movable frame 4 is swung to a vertical position, the foot portions 2 resting upon the table or other support, as shown in Figure 2, relieve the springs 20 of an excessive downward bearing pressure. After the frame 4 is raised to this vertical position the ice cream block or other material to be cut is arranged upon the insulating slab 7 and against the inner sides of the lugs 18 on the base frame. The handle 5 is now grasped and the frame 4 swung downwardly. In this movement the several knives 9 cut cleanly through the block of cream and divide the same into the desired number of parts or sections. These knives cut completely through the cream block and are received in the channels or grooves 8 of the insulating slab. The contact of the frame 4 upon the upper end of the standard 13 limits this downward swinging movement of the frame and prevents dulling of the cutting edges of the knives by their forcible contact against the base walls of the grooves 8. The frame 4 is now disposed substantially in parallel relation to the base frame in which position it will be observed that the offset end portions of the frame 4 are disposed below the plane of the upper surface of the slab 7. Thus, no obstruction is presented to the longitudinal movement of the separated portions of the ice cream block from the slab 7. This feature will be found of considerable advantage in facilitating the handling of the separated portions of cream.

From the foregoing description it will be seen that I have produced a very simply constructed machine for cutting ice cream blocks and the like, which may be readily kept in a thoroughly sanitary condition. The knife carrying frame 4 can be easily and quickly detached from the base frame by simply elevating the same upwardly and then forcing the pivot studs downwardly past the retaining springs 20 and out of the recesses 22. The two frame parts being thus separated, the several parts thereof, as well as the cutting knives, can be quickly and thoroughly cleaned. As above noted, this detachable pivotal connection between the two frames permits of the use of interchangeable knife carrying frames for the cutting of the ice cream or other material into sections of a variety of sizes.

Preferably, the two frame sections are constructed of aluminum so that the device will be very light in weight and can be easily moved from place to place as may be required. I have herein shown and described a preferable embodiment of the invention, which I have found to be very satisfactory in practical use. However, it is nevertheless to be understood that the invention might also be embodied in many other alternative constructions and I accordingly reserve the priviledge of adopting all such legitimate changes in the form, preparation and relative arrangement of the several parts as may be fairly considered within the spirit and scope of the invention as claimed.

I claim:

1. A cutting device of the character described, comprising a base frame provided with means to support the material to be cut, a knife carrying frame, and means for pivotally connecting the knife carrying frame to the base frame, for movement in a vertical plane toward and from the supporting means to cut the material, said connecting means being constructed to enable the knife carrying frame to be detached from the base frame by manipulation of the frames.

2. A cutting device of the character described including a base frame having pivot receiving recesses and provided with means for supporting the material to be cut, a knife carrying frame, pivot studs fixed in the knife carrying frame adapted for engagement in said recesses of the base frame, and means normally exerting a yielding pressure upon the pivot studs to retain the same in said recesses and supporting the knife carrying frame for pivotal movement relative to the base frame but permitting of its detachment from said base frame.

3. A cutting device of the character described including a base frame having means for supporting the material to be cut and provided with an arm extending laterally therefrom and terminating in a downwardly projecting finger, said arm having a pivot receiving recess at the inner side of the finger, a knife carrying frame also having a laterally projecting arm, a pivot stud fixed in said arm and adapted to be engaged in said recess and a leaf spring fixed to the arm on the base frame and exerting an upward pressure against said pivot stud to detachably retain the same in said recess.

4. In a cutting machine of the character described, a frame, a plurality of cutting knives extending across said frame, and means for detachably connecting the ends of each knife to opposite sides of the frame, said means including a polygonal enlargement on the knife, said frame having an opening of like shape and size to receive said enlargement and being also provided with a socket with which said opening communicates, and the knife being provided with a longitudinally extending threaded stem projecting from the enlargement through said socket, and a sleeve adapted to engage in said socket and threaded upon said stem to thereby detachably secure the knife end in the frame bar.

5. A cutting device of the character described comprising a base frame provided with means to support the material to be cut and having laterally extended arms, a knife-carrying frame mounted for movement between horizontal and vertical positions and having laterally extending arms provided at their ends with plane surfaces, and means for pivotally connecting the arms of the knife-carrying frame to the arms of the base frame, said means being constructed to permit the knife-carrying frame to be depressed onto said plane surfaces after it has been swung back to vertical position.

6. A cutting frame having oppositely disposed side bars provided on their inner sides with polygonal openings and on their outer sides with sockets communicating with the openings, cutting knives extending from side to side of the frame and having polygonal enlargements adjacent to their ends of like shape and size to said openings and adapted to be received in the openings so as to prevent lateral or turning movement of the knives, and means contained in said sockets inwardly of the outer surfaces of the bar for securing the knives against longitudinal displacement in said frame.

In testimony that I claim the foregoing as my invention, I have signed my name hereunder.

RUDOLPH H. SCHULTZ.